United States Patent Office 3,422,199
Patented Jan. 14, 1969

---

3,422,199
ACARICIDAL COMPOSITION CONTAINING N-SUBSTITUTED AND UNSUBSTITUTED ALKYL AND ALKENYL - 2-DIMETHYLAMINO-BENZHYDRYL-CARBAMATES
Sidney B. Richter and David P. Mayer, Chicago, Ill., assignors to Velsicol Chemical Corporation, Chicago, Ill., a corporation of Illinois
No Drawing. Continuation-in-part of application Ser. No. 634,830, May 1, 1967. This application May 23, 1967, Ser. No. 640,495
U.S. Cl. 424—300        12 Claims
Int. Cl. A01n 9/20

---

ABSTRACT OF THE DISCLOSURE

An acaricidal composition comprising an inert carrier and, in a quantity toxic to acarids, the compound of the formula

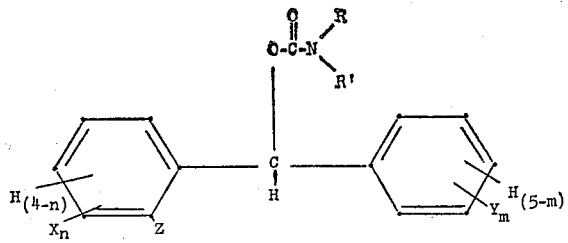

wherein R is selected from the group consisting of substituted and unsubstituted alkyl and alkenyl; R' is selected from the group consisting of hydrogen and substituted and unsubstituted alkyl and alkenyl; Z is dialkylamino; each X and Y is independently selected from the group consisting of dialkylamino, alkyl, alkenyl, halogen, nitro, alkoxy and alkylthio; n is an integer from 0 to 2; and m is an integer from 0 to 3. A method for the control of acarids which comprises applying to said acarids the aforescribed composition in a quantity toxic to said acarids.

---

This application is a continuation in part of our copending application Ser. No. 634,830, filed May 1, 1967, now abandoned, which is a division of our copending application Ser. No. 454,688, filed May 10, 1965, now U.S. Patent 3,340,294.

This invention relates to new chemical compositions of matter. More particularly, this invention relates to new chemical compositions of the formula

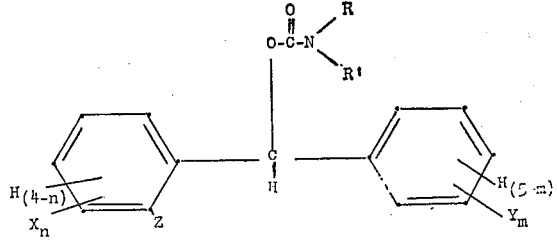

wherein R is selected from the group consisting of substituted and unsubstituted alkyl and alkenyl; R' is selected from the group consisting of hydrogen and substituted and unsubstituted alkyl and alkenyl; Z is dialkylamino; each X and Y is independently selected from the group consisting of dialkylamino, alkyl, alkenyl, halogen, nitro, alkoxy and alkylthio; n is an integer from 0 to 2; and m is an integer from 0 to 3. In a preferred embodiment of this invention R is selected from the group consisting of lower alkyl, lower alkenyl, lower alkoxyalkyl, lower mono and polychloroalkyl, R' is selected from the group consisting of hydrogen and R; Z is di (lower alkyl) amino; X and Y are independently selected from the group consisting of di (lower alkyl) amino, lower alkyl, lower alkenyl, halogen, nitro, lower alkoxy, and lower alkylthio; n is an integer from 0 to 2; and m is an integer from 0 to 3.

Unexpectedly, the compounds of the present invention are effective as acaricides and fungicides. Exemplary of compounds of the present invention are:

N-methyl-2-dimethylaminobenzhydrylcarbamate,
N-allyl-2-dimethylaminobenzhydrylcarbamate,
N-methoxyethyl-2-dimethylaminobenzhydrylcarbamate,
N-methyl-N-ethyl-2-dimethylaminobenzhydrylcarbamate,
N-beta-chloroethyl-2-dimethylaminobenzhydryl-
  carbamate,
N-methyl-2-dimethylamino-5-chlorobenzhydryl-
  carbamate,
N-methyl-2-dimethylamino-4-chlorobenzhydryl-
  carbamate,
N-methyl-2-dimethylamino-5-bromobenzhydryl-
  carbamate,
N-methyl-2-dimethylamino-2'-methyl-5-chlorobenzhy-
  drylcarbamate,
N-methyl-2-dimethylamino-4'-methyl-5-chloro-
  benzhydrylcarbamate,
N-methyl-2-dimethylamino-3',5-dichlorobenzhydryl-
  carbamate,
N-methyl-2-dimethylamino-4',5-dichlorobenzhydryl-
  carbamate,
N-methyl-2,4,4'-tris(dimethylamino)benzhydryl-
  carbamate,
N-n-propyl-2-di-n-propylamino-4'-bromobenzhydryl-
  carbamate,
N-beta-chloroethyl-2-diethylamino-5'-bromobenzhydryl-
  carbamate,
N,N-diallyl-2-dimethylamino-5'-chlorobenzhydryl-
  carbamate,
N,N-dimethyl-2-di-isopropylamino-5-chloro-4'-methoxy-
  benzhydrylcarbamate,
N-isopropyl-2-di-(2-ethylhexyl)amino-3'-chloro-4'-
  methylbenzhydrylcarbamate,
N-beta-dichloroethyl-2-di-n-propylamino-4,5-dichloro-
  benzhydrylcarbamate,
N-methyl-2-diethylamino-2',4-dimethoxybenzhydryl-
  carbamate,
N-methyl-2-dimethylamino-2'-allylbenzhydrylcarbamate,
N,N-dimethyl-2-diethylamino-2'-methylthiobenzhydryl-
  carbamate,
N-methyl-2-(N'-methyl-N'-ethylamino)-5-chloro-
  benzhydrylcarbamate,
N-methyl-2-(N'-methyl N'-n-propylamino)-5-chloro-
  benzhydrylcarbamate,
N-methyl-2-(N'-methyl-N'-isopropylamino)-5-chloro-
  benzhydrylcarbamate, and the like.

These compounds can be prepared readily, for example, by reacting a suitable dialkylaminobenzhydrol with a suitable isocyanate or carbamoyl halide. The reaction can be conveniently carried out in a suitable solvent such as benzene, dioxane, and the like. An excess of the isocyanate or carbamoyl halide is preferably utilized in this reaction. The reaction mixture is heated, for example at reflux if benzene or dioxane is utilized, for from about 6 to about 24 hours with stirring. A catalyst or base such as triethylamine can also be utilized, particularly when the carbamoyl halide is used as a reactant, and in that case a stoichiometric amount is preferred. The solvent is removed from the reaction mixture and the desired compound recovered by methods common to the art such as by boiling with charcoal and recrystallizing from a suitable solvent.

Suitable dialkylaminobenzhydrol reactants useful in the preparation of the compounds of the present invention can be readily prepared by several methods from the corresponding dialkylaminobenzophenone, for example by reduction with lithium aluminum hydride. The dialkylaminobenzophenone can be prepared from the corresponding aminobenzophenone by alkylation procedures known to the art, such as treatment with dimethyl sulfate, formic acid and formaldehyde, alkyl halides or alkenyl halides, and combinations thereof. In some cases the dialkylaminobenzophenone can be prepared from the corresponding halobenzophenone by reaction with dialkylamines, such as N-methyl-N-ethylamine,
N-methyl-N-isopropylamine,
N-methyl-N-n-propylamine,
N-methyl-N-n-butylamine,
N-methyl-N-sec-butylamine,
N-methyl-N-amylamine,
N-ethyl-N-n-propylamine,
N-ethyl-N-isopropylamine.

Exemplary of various of these starting materials are:
2-dimethylaminobenzhydrol,
2-dimethylamino-5-chlorobenzhydrol,
2-dimethylamino-4-chlorobenzhydrol,
2-dimethylamino-5-bromobenzhydrol,
2-bromobenzophenone,
2-chlorobenzophenone,
2,2'-dibromobenzophenone,
2,4-dibromobenzophenone,
2,6-dibromobenzophenol,
2-bromo-5-chlorobenzophenone,
2-bromo-3'-chlorobenzophenone,
2-bromo-3',5-dichlorobenzophenone,
2-bromo-4-methylbenzophenone,
4-dimethylamino-2'-chlorobenzophenone,
2-amino-5'-bromobenzophenone,
2-amino-5'-chlorobenzophenone,
4-amino-2'-chlorobenzophenone,
2-amino-5-chloro-4'-methoxybenzophenone,
2'-amino-3-chloro-4-methylbenzophenone,
4-amino-2-chloro-2'-methylbenzophenone,
2-amino-4,5-dichlorobenzophenone,
2-amino-2',4-dimethoxybenzophenone, and the like.

The benzophenones can be readily prepared by the Friedel-Crafts reaction of a suitably substituted benzoyl chloride with aniline or a suitably substituted aniline. This reaction, well known in the art, can be carried out, for example, by heating a substituted benzoyl chloride to about 120° C., adding a substituted aniline, heating the reaction mixture to about 180° C., adding zinc chloride and reacting the mixture at about 220° C. for a period of about ½ to about 2 hours. The product can be dissolved in an organic solvent, washed with an inorganic base, dried and recovered by stripping off the solvent to yield the desired benzophenone.

Exemplary of suitable anilines are 4-chloroaniline, 4-bromoaniline, 4-methylaniline, 3-chloroaniline, 4-methoxyaniline, 4-methylthioaniline, 4-nitroaniline, 4-allylaniline, 3,5-dichloroaniline, 3-methylaniline, 2,4-dichloroaniline and the like.

Exemplary of suitable benzoyl chlorides are 2-methylbenzoyl chloride, 4-chlorobenzoyl chloride, 4-methoxybenzoyl chloride, 3-methoxy-4-methylbenzoyl chloride, 3,4-dimethylbenzoyl chloride, 4-methylbenzoyl chloride, 2-chlorobenzoyl chloride, 4-nitrobenzoyl chloride 2-allylbenzoyl chloride and the like.

Among the suitable isocyanates and carbamoyl halides for use in the preparation of the compounds of this invention are: lower alkyl isocyanates, such as: methylisocyanate, ethylisocyanate, n-propylisocyanate, isopropylisocyanate, cyclohexylisocyanate, isobutylisocyanate, tert-butylisocyanate, and the like; alkenyl isocyanates, such as allylisocyanate, and the like; alkoxyalkyl isocyanates, such as methoxymethyl isocyanate, 2-methoxyethylisocyanate, ethoxymethyl isocyanate, 2-ethoxyethyl isocyanate, and the like; chloroalkyl isocyanates, such as dichloromethylisocyanate, 2-chloroethylisocyanate, 1-chloro-1-methylethylisocyanate, and the like; dialkyl carbamoyl halides, such as dimethylcarbamoyl bromide, diethylcarbamoyl chloride, dimethylcarbamoyl chloride, diisopropylcarbamoyl chloride, dibutylcarbamoyl chloride, dicyclohexylcarbamoyl chloride, dipentylcarbamoyl chloride, and the like; alkenylcarbamoyl halides, such as divinylcarbamoyl chloride, isopropenylcarbamoyl bromide, allyl-tert-butylcarbamoyl chloride, allyl-(chloromethyl) carbamoyl chloride, and the like; alkoxy-alkyl carbamoyl halides, such as bis(2-ethoxyethyl) carbamoyl chloride, (2-ethoxyethyl)ethylcarbamoyl chloride, ethyl(2-methoxyethyl) carbamoyl chloride, and the like; and chloroalkyl carbamoyl halides, such as 2-chloroethyl carbamoyl fluoride, bis(chloromethyl) carbamoyl chloride, bis(dichloromethyl) carbamoyl chloride, and the like.

The manner in which the new compounds of the present invention can be prepared readily is illustrated in the following examples:

EXAMPLE 1

Preparation of 2-dimethylamino-5-chlorobenzhydrol

2-Amino-5-chlorobenzophenone (11.5 grams; 0.05 mol) formic acid (23 ml.; 0.6 mol) and formaldehyde (15 ml.; 38% assay) were placed in a 250 ml. glass reaction flask equipped with mechanical stirrer, internal thermometer and reflux condenser. The reaction mixture was heated at reflux, with continuous stirring, for a period of about 17 hours. After this time the reaction mixture was diluted with water (200 ml.) and extracted twice with ether. The two ether extracts were combined and washed first with aqueous sodium hydroxide (50 ml.; 3 N) and then with water. The washed ether extract was dried over magnesium sulfate, filtered and evaporated on a steam bath. The residue was triturated with cold pentane and recovered by filtration to yield 2-methylamino-5-chlorobenzophenone as a yellow solid having a melting point of 88 to 90° C.

A solution of lithium aluminum hydride (10 grams; 0.3 mol) in ether (800 ml.) was charged into a 2,000 ml. glass reaction flask equipped with mechanical stirrer, internal thermometer and reflux condenser topped with drying tube. A solution of 2-dimethylamino-5-chlorobenzophenone (18 grams; 0.07 mol) in ether (500 ml.) was added to the reaction flask over a period of about 15 minutes with continuous stirring. The reaction mixture was heated at reflux, with stirring, for a period of about 6 hours. After this time the reaction mixture was allowed to stand over the weekend at room temperature. A solution of sodium potassium tartrate (7.8 grams; 0.03 mol) in water (40 ml.) was added dropwise, with stirring, to the reaction mixture. The resulting mixture was filtered and the filter cake washed with ether. The filtrate was dried over magnesium sulfate, filtered and evaporated on a steam bath. The residue was recrystallized from ethanol to yield 2-dimethylamino-5-chlorobenzhydrol having a melting point of 87 to 89° C.

EXAMPLE 2

Preparation of N-methyl-2-dimethylamino-5-chlorobenzhydrylcarbamate 2-dimethylamino-5-chlorobenzhydrol (10 g.; 0.04 mol), methylisocyanate (10 g.; 0.2 mol), triethylamine (1 ml.) and benzene (150 ml.) were placed in a 250 ml. three-neck, round-bottomed flask equipped with a mechanical stirrer, internal thermometer and reflux condenser. The mixture was stirred and heated at reflux for 17 hours. Benzene was removed from the reaction mixture by warming the mixture under reduced pressure. The residue was triturated with pentane and allowed to solidify to a solid having a melting point of 86–90° C. The solid was recrystallized from hexane to yield the desired N-methyl-2-dimethylamino-5-chlorobenzhydrylcarbamate as a solid melting at 90–92° C. and having the following elemental analysis:

Calculated for $C_{17}H_{19}ClN_2O_2$. Theoretical: C, 64.04%; H, 6.01%; N, 8.79%. Found: C, 64.37%; H, 6.33%; N, 8.63%.

EXAMPLE 3

Preparation of N-allyl-2-dimethylamino-5-chlorobenzhydrylcarbamate 2-dimethylamino-5-chlorobenzhydrol (4.8 g.; 0.02 mol), allylisocyanate (2.5 g.; 0.03 mol), triethylamine (1 g.) and benzene (50 ml.) were placed in a 250 ml. three-neck round-bottomed flask equipped with a mechanical stirrer, internal thermometer and reflux condenser. The mixture was stirred and heated at reflux for about 17 hours. The mixture was cooled and then heated under reduced pressure to remove benzene. The residue solidified on cooling and was recrystallized from absolute ethanol to yield N-allyl-2-dimethylamino-5-chlorobenzhydrylcarbamate as a white, needle-like solid having a melting point of 149–151° C. and the following elemental analysis:

Calculated for $C_{19}H_{21}ClN_2O_2$. Theoretical: C, 66.17%; H, 6.14%; N, 8.12%. Found: C, 65.73%; H, 6.37%; N, 8.10%.

EXAMPLE 4

Preparation of N-isopropyl-2-dimethylamino-5-chlorobenzhydrylcarbamate 2-dimethylamino-5-chlorobenzhydrol (5.2 g.; 0.02 mol), isopropylisocyanate (2.5 ml.), triethylamine (1 g.) and benzene (50 ml.) were placed in a 250 ml. three-neck, round-bottomed flask equipped with a mechanical stirrer, internal thermometer and reflux condenser. The mixture was stirred and heated at reflux for 17 hours. The reaction mixture was cooled and benzene removed by heating under reduced pressure. The residue solidified and was recrystallized from a benzene-heptane mixture to yield N - isopropyl - 2 - dimethylamino - 5 - chlorobenzhydrylcarbamate as a white solid melting at 110–113° C. A portion of the product which was recrystallized a second time had a melting point of 110–110.5° C. and the following elemental analysis:

Calculated for $C_{19}H_{23}ClN_2O_2$. Theoretical: C, 65.79%; H, 6.68%; N, 8.08%. Found: C, 65.45%; H, 7.02%; N, 7.84%.

EXAMPLE 5

Preparation of N,N-dimethyl-2-dimethylamino-5-chlorobenzhydrylcarbamate 2-dimethylamino-5-chlorobenzhydrol (2.6 g.; 0.01 mol), N,N-dimethylcarbamoyl chloride (2.5 g.; 0.2 mol), triethylamine (2 g.) and xylene (50 ml.) were placed in a 250 ml. three-neck round-bottomed flask equipped with a mechanical stirrer, internal thermometer and reflux condenser. The mixture was stirred and heated at reflux for about 17 hours. The mixture was cooled to room temperature and filtered. The filtrate was washed with water, dried over anhydrous sodium sulfate, filtered and the filtrate distilled on a steam bath at 0.1 mm. mercury for one hour. This residue was determined to be N,N-dimethyl-2-dimethylamino-5-chlorobenzhydrylcarbamate by infrared analysis and had the following elemental analysis:

Calculated for $C_{18}H_{21}ClN_2O_2$. Theoretical: C, 64.95%; H, 6.36%; N, 8.42%. Found: C, 64.91%; H, 6.63%; N, 8.18%.

EXAMPLE 6

Preparation of N-beta-chloroethyl-2-diethylamino-5'-bromobenzhydrylcarbamate

2 - amino - 5' - bromobenzophenone (50.4 g.; 0.2 mol), ethylbromide (55 g.; 0.5 mol), triethylamine (50 g.) and ethanol (150 ml.) are placed in a 250 ml. three-neck, round bottomed flask equipped with a mechanical stirrer, internal thermometer and reflux condenser. The reaction mixture is gently heated over a period of several hours. The reaction mixture is then heated under reduced pressure to remove ethanol, and the residue treated with aqueous sodium hydroxide (88 g.; 2.2 moles). The organic layer is separated, washed with water, dried, and distilled under reduced pressure to remove unreacted materials. The residue is purified by distilling and/or recrystallizing from a suitable solvent to obtain 2 - diethylamino - 5'-bromobenzophenone.

Lithium aluminum hydride (10 g.; 0.25 mol) in anhydrous diethyl ether (800 ml.) is stirred in a 2-liter flask equipped with a reflux condenser topped by a drying tube. 2-diethylamino-5'-bromobenzophenone (18 g.; 0.05 mol) prepared as described above, dissolved in anhydrous diethyl ether (500 ml.) is added to the flask over a period of 15 minutes. The flask is heated at reflux for 6 hours. A solution of sodium potassium tartrate (7.8 g.) dissolved in water (40 ml.) is added dropwise to the cooled, stirred reaction mixture. The resulting mixture is filtered, and the filtrate washed with water, dried over anhydrous magnesium sulfate, and filtered. The filtrate is heated on a steam bath under reduced pressure to remove diethyl ether and yield 2-diethylamino-5'-bromobenzhydrol as the residue.

2 - diethylamino - 5' - bromobenzhydrol (6.68 g.; 0.02 mol), 2-chloroethylisocyanate (18.5 g.), triethylamine (1 g.) and benzene (50 ml.) are placed into the flask described in the previous examples and heated at reflux for 17 hours. The reaction mixture is cooled and the benzene removed by heating under reduced pressure to yield N - beta - chloroethyl - 2 - diethylamino - 5' - bromobenzhydrylcarbamate as the residue.

EXAMPLE 7

Preparation of 2-dimethylamino-2'-methyl-5-chlorobenzophenone o - Methylbenzoyl chloride (17.4 g.; 0.1 mol) was heated with stirring to about 125° C. in a 250 ml. glass reaction flask, equipped with mechanical stirrer, internal thermometer and reflux condenser. p-Chloroaniline (6.4 g.; .05 mol) was slowly added to the flask over a period of 15 minutes, and the mixture was heated to 180° C. Dry zinc chloride (6.4 gr.) was added and the reaction mixture was heated to a temperature of from about 225 to about 230° C. for a period of about 2 hours. After this time the reaction mixture was cooled to about 120° C. A mixture of glacial acetic acid (40 ml.) and hydrogen bromide (40 ml.; assay 48%) was added to the reaction mixture and refluxed for a period of about 17 hours. After this time the reaction mixture was concentrated under reduced pressure and hydrochloric acid (100 ml.; 3 N) was added. The mixture was heated to boiling and was decanted. The residue was heated to reflux for about 40 minutes in sulfuric acid (32 ml.; 75% v./v.) and poured over ice. The resulting mixture was extracted twice with ether and the combined ether portions washed with 3 N hydrochloric acid, with 5 N sodium hydroxide and with water. The washed extract was dried over magnesium sulfate, filtered and evaporated to yield a red viscous oil. The oil was distilled to yield 2-amino-2'-methyl-5-chlorobenzophenone having a boiling point of 130 to 140° C. at 0.02 mm. Hg pressure.

2-amino-2'-methyl-5-chlorobenzophenone (8 gms.; 0.03 mol), prepared above, and trimethylphosphate (12 gms.; 0.09 mol) were charged into a 250 ml. glass reaction flask equipped with stirrer, thermometer and reflux condenser. The reaction mixture was heated with stirring at about 160° C. for a period of about 2½ hours. After this time the reaction mixture was cooled to 120° C. and a solution of sodium hydroxide (10 gm.) in water (75 ml.) was added. The reaction mixture was then refluxed for about 1½ hours and let stand at room temperature overnight. The reaction mixture was then extracted with ether, the ether extract dried over magnesium sulphate, filtered and evaporated. The residue was vacuum distilled to yield 2 - dimethylamino-2'-methyl-5-chlorobenzophenone as a yellow liquid.

EXAMPLE 8

Preparation of 2-dimethylamino-2'-methyl-5-chlorobenzhydrol

A solution of lithium aluminum hydride (1.5 grams; 0.04 mol) in ether (100 ml.) was charged, with stirring, into a 500 ml. glass reaction flask equipped with stirrer, internal thermometer and reflux condenser. A solution of 2 - dimethylamino-2'-methyl-5-chlorobenzophenone (5.9 grams; 0.02 mol) in either (100 ml.) was added to the reaction flask over a period of about 15 minutes with continuous stirring. The reaction mixture was then heated at reflux for a period of about 3½ hours. After this time the reacton mixture was cooled to room temperature. A solution of sodium potassium tartrate (1.5 grams) in water (6 ml.) was then added dropwise, with stirring, to the cooled reaction mixture. The resulting mixture was allowed to stand overnight and was then distilled under reduced pressure to yield 2-dimethyl-amino-2'-methyl-5-chlorobenzhydrol having a boiling point of 143 to 152° C. at 0.15 mm. Hg pressure.

EXAMPLE 9

Preparation of N-methyl-2-dimethylamino-2'-methyl-5-chlorobenzhydrylcarbamate 2-dimethylamino-2'-methyl - 5 - chlorobenzhydrol (2.3 grams; 0.01 mol), methylisocyanate (2.0 ml.; 0.04 mol), dibutyl tin diacetate (1 drop) and benzene (50 ml.) were placed into a 250 ml. glass reaction flask equipped with mechanical stirrer, internal thermometer and reflux condenser. The reaction mixtures was refluxed with stirring for a period of about 17 hours. After this time the mixture was cooled and then heated under reduced pressure to remove the benzene. The residue was held under 0.05 mm. of Hg pressure for a period of about 1 hour to yield N-methyl-2-dimethylamino-2'-methyl - 5-chlorobenzhydrylcarbamate as a pale yellow liquid having the following elemental analysis.

Analysis for $C_{18}H_{21}ClN_2O_2$.—Calculated: C, 64.95%; H, 6.36%; N, 8.42%. Found: C, 66.02%, H, 7.56%; N, 9.09%.

EXAMPLE 10

Preparation of 2-dimethylamino-4'-methyl-5-chlorobenzophenone

Para-methylbenzoyl chloride (33.3 grams; 0.2 mol) was heated, with stirring to about 120° C. in a glass reaction flask equipped with mechanical stirrer, internal thermometer and reflux condenser. Para-chloroaniline (6.4 grams; 0.05 mol) was slowly added to the flask over a period of 15 minutes and the mixture was heated to 180° C. Dry zinc chloride (17.4 gms.) was then added and the reaction mixture heated to a temperature of from about 220 to about 240° C. for a period of about 2 hours. After this time the reaction mixture was cooled to about 120° C. A mixture of glacial acetic acid (40 ml.) and hydrogen bromide (40 ml.; assay 48%) was added to the reaction flask and refluxed overnight. The reaction mixture was then concentrated under reduced pressure by removing excess solvent. The residue was refluxed for about 40 minutes in sulfuric acid (64 ml.; 75/ v./v.) and poured over crushed ice. The resulting mixture was extracted with ether and the ether extract washed first with sodium hydroxide (100 ml.; 3 N) and then with water. The extract was then dried over magnesium sulfate, filtered and evaporated. The residue was distilled to yield 2-amino-4'-methyl-5-chlorobenzophenone.

2-amino-4'-methyl-5-chlorobenzophenone (8.4 gms.; 0.03 mol), formic acid (23 ml.; 0.6 mol) and formaldehyde (15 ml.; 38% assay) were charged into a 250 ml. glass reaction flask equipped with mechanical stirrer, reflux condenser and internal thermometer. The reaction mixture was refluxed for a period of about 17 hours. After this time the mixture was diluted with water (200 ml.) and extracted two times with ether. The two ether extracts were combined and washed first with aqueous sodium hydroxide (100 ml.; 3 N) and then with water. The ether extract was then dried over magnesium sulfate, filtered and evaporated. The residue was distilled to yield 2-dimethylamino-4'-methyl-5-chlorobenzophenone as a yellow liquid having a boiling point of 136 to 141° C. at 0.02 mm. Hg pressure.

EXAMPLE 11

Preparation of 2-dimethylamino-4'-methyl-5-chlorobenzhydrol

A solution of lithium aluminum hydride (1.5 grams; 0.04 mol) in ether (100 ml.) was charged, with stirring, into a 250 ml. glass reaction flask equipped with mechanical stirrer, internal thermometer and reflux condenser. A solution of 2-dimethylamino-4'-methyl-5-chlorobenzophenone (7.0 grams; 0.03 mol) in ether (100 ml.) was added to the reaction flask over a period of about 15 minutes with continuous stirring. The reaction mixture was then heated at reflux with continuous stirring for a period of about 6 hours. After this time the reaction mixture was cooled to room temperature. A solution of sodium potassium tartrate (1.5 grams) dissolved in water (6 ml.) was added dropwise, with stirring to the cooled reaction mixture. The resulting mixture was filtered and the filter cake washed with ether. The filtrate was dried over magnesium sulfate, filtered and evaporated to yield a liquid as the residue. The residue was distilled under vacuum to yield 2-dimethylamino-4'-methyl-5-chlorobenzhydrol having a boiling point of 137 to 142° C. at 0.05 mm. Hg pressure.

EXAMPLE 12

Preparation of N-methyl-2-dimethylamino-4'-methyl-5-chlorobenzhydrylcarbamate 2-dimethyl-4'-methyl-5-chlorobenzhydrol (2.0 grams; 0.01 mol), methyl isocyanate (3.0 ml.; 0.05 mol), dibutyl tin diacetate (1 drop) and ether (50 ml.) were placed in a 100 ml. glass reaction flask. The reaction mixture was allowed to stand at room temperature for a period of about three days. After this time the ether was removed under reduced pressure at 60° C. The residue was held for about one hour at 0.02 mm. of Hg pressure and 60° C. to yield N-methyl-2-dimethylamino-4'-methyl-5-chlorobenzhydrylcarbamate as the product having a melting point of 83.5 to 86° C. and having the following elemental analysis:

Analysis for $C_{18}H_{21}ClN_2O_2$.—Calculated: C, 64.95%; H, 6.36%; Cl, 10.65%. Found: C, 64.34%; H, 6.37%; Cl, 11.13.

EXAMPLE 13

Preparation of 2-dimethylamino-4',5-dichlorobenzophenone 2-amino-4',5-dichlorobenzophenone (8 gms.; 0.03 mol), formic acid (23 ml.; 0.06 mol), and formaldehyde (15 ml.; 38%) were charged into a 250 ml. glass reaction flask equipped with mechanical stirrer, internal thermometer and reflux condenser. The reaction mixture was refluxed with continuous stirring for a period of about 17 hours. After this time the reaction mixture was diluted with water (200 ml.) and extracted twice with ether. The two ether extracts were combined and washed first with aqueous sodium hydroxide (100 ml.; 3 N) and then with water. The extract was then dried over magnesium sulfate, filtered and evaporated on a steam bath. The residue was vacuum distilled to yield 2-dimethylamino-4',5-dichlorobenzophenone as a yellow liquid having a boiling point of 140 to 145° C. at 0.05 mm. Hg pressure.

EXAMPLE 14

Preparation of 2-dimethylamino-4',5-dichlorobenzhydrol

A solution of lithium aluminum hydride (1.5 grams; 0.04 mol) in ether (100 ml.) was charged, with stirring, into a 500 ml. glass reaction flask equipped with mechanical stirrer, internal thermometer and reflux condenser. A solution of 2-dimethylamino-4',5-dichlorobenzophenone (7.1 grams; 0.03 mol) in ether (100 ml.) was slowly added to the reaction flask over a period of about 15 minutes. The reaction mixture was heated at reflux for a period of about 6½ hours. After this time the reaction mixture was cooled to room temperature. A solution of sodium potassium tartrate (1.5 grams) in water (6 ml.) was added dropwise, with stirring, to the cooled reaction mixture. The resulting mixture was filtered and the filter cake washed with ether. The filtrate was dried over magnesium sulfate, filtered and evaporated to yield a liquid as the residue. The residue was distilled under vacuum to yield 2-dimethylamino-4',5-dichlorobenzhydrol having a boiling point of 150 to 155° C. at 0.02 mm. Hg pressure.

EXAMPLE 15

Preparation of N-methyl-2-dimethylamino-4',5-dichlorobenzhydrylcarbamate 2-dimethylamino-4',5-dichlorobenzhydrol (2.0 grams; 0.01 mol) methyl isocyanate (2.0 ml.; 0.04 mol) dibutyl tin diacetate (1 drop) and ether (50 ml.) were placed in a glass reaction flask. The reaction mixture was allowed to stand at room temperature for about 3 days. After this time the ether was removed under reduced pressure in a rotary evaporator. The residue was triturated with pentane yielding a white solid. The solid was recrystallized from ethanol to yield N-methyl-2-dimethylamino-4',5-dichlorobenzhydrylcarbamate having a melting point of 94 to 97° C. and having the following elemental analysis:

Analysis for $C_{17}H_{18}Cl_2N_2O_2$.—Calculated: C, 57.80%; H, 5.14%; N, 7.93%. Found: C, 58.17%; H, 5.28%; N, 7.92%.

EXAMPLE 16

Preparation of 2-dimethylamino-3',5-dichlorobenzophenone 2-amino-3',5-dichlorobenzophenone (8 gms.; 0.03 mol), formic acid (23 ml.; 0.6 mol) and formaldehyde (15 ml.; 38%) were charged into a 250 ml. glass reaction flask equipped with mechanical stirrer, internal thermometer and reflux condenser. The reaction mixture was refluxed, with continuous stirring, for a period of about 17 hours. After this time the reaction mixture was diluted with water (200 ml.) and extracted twice with ether. The two ether extracts were combined, washed first with aqueous sodium hydroxide (100 ml.; 3 N), and then with water. The extract was then dried over magnesium sulfate, filtered and evaporated on a steam bath. The residue was vacuum distilled to yield 2-dimethylamino-3',5-dichlorobenzophenone as a yellow liquid having a boiling point of 130 to 135° C. at 0.02 mm. Hg pressure.

EXAMPLE 17

Preparation of 2-dimethylamino-3',5-dichlorobenzhydrol

A solution of lithium aluminum hydride (2.0 gms.; 0.05 mol) in ether (100 ml.) was charged, with stirring, into a 500 ml. glass reaction flask equipped with stirrer, internal thermometer and reflux condenser. A solution of 2-dimethylamino-3',5-dichlorobenzophenone (11.7 gms.; 0.04 mol) in ether (150 ml.) was then slowly added to the reaction flask over a period of about 15 minutes. The reaction mixture was then heated at reflux for a period of about 17 hours. The reaction mixture was cooled to room temperature. A solution of sodium potassium tartrate (2.0 gms.) in water (8 ml.) was added dropwise, with stirring, to the cooled reaction mixture. The resulting mixture was filtered and the filter cake washed with ether. The filtrate was dried over magnesium sulphate, filtered and evaporated. The residue was distilled under vacuum to yield 2-dimethylamino-3',5-dichlorobenzhydrol having a boiling point of 144 to 148° C. at 0.02 mm. Hg pressure.

EXAMPLE 18

Preparation of N-methyl-2-dimethylamino-3',5-dichlorobenzhydrylcarbamate 2-dimethylamino-3',5-dichlorobenzhydrol (2.0 gr.; 0.01 ml.), methyl isocyanate (2.0 ml.; 0.04 mol), dibutyl tin diacetate (1 drop) and ether (50 ml.) were placed in a reaction flask. The reaction mixture was allowed to stand for a period of about 3 days. After this time the ether was removed under reduced pressure in a rotary evaporator at 60° C. over a period of about 1 hour. The residue was triturated in pentane and filtered to yield a white solid. The solid was recrystallized from ethanol to yield N-methyl - 2 - dimethylamino - 3',5 - dichlorobenzhydrylcarbamate having a melting point of 94.0 to 96.5° C. and having the following elemental analysis:

Analysis for $C_{17}C_{18}Cl_2N_2O_2$.—Theoretical: C, 57.80%; H, 5.14%; N, 7.93%. Found: C, 57.82%; H, 5.28%; N, 7.93%.

The other compounds of the present invention can be prepared readily by the procedures described above. Presented in the following examples are the essential reactants required to prepare the indicated named compounds according to the methods detailed in the foregoing examples:

EXAMPLE 19

2 - dimethylaminobenzhydrol+methoxymethylisocyanate=N - methoxymethyl - 2 - diamethylaminobenzhydrylcarbamate.

EXAMPLE 20

2 - amino - 4,4' - bis(dimethylamino)benzophenone + formic acid and formaldehyde+bis(2-ethoxyethyl)-carbamoyl chloride=N,N-di-(2-ethoxyethyl-2,4,4'-tris-(dimethylamino)-benzhydrylcarbamate.

EXAMPLE 21

2-amino-5-chlorobenzophenone+ethylbromide+formic acid and formaldehyde+methylisocyanate=N - methyl-2-(N' - methyl - N' - ethylamino) - 5 - chlorobenzhydrylcarbamate.

EXAMPLE 22

2-amino-2',4-dimethoxybenzophenone+ethylbromide+divinylcarbamoyl chloride=N,N - divinyl - 2 - diethylamino-2',4-dimethoxybenzhydrylcarbamate.

EXAMPLE 23

2 - bromo-5-chlorobenzophenone+N-methyl-N-isopropylamine+methylisocyanate=N - methyl - 2 - (N'-methyl-N'-isopropylamine)-5-chlorobenzhydrylcarbamate.

The compounds of the present invention can be used to effectively control acarids, that is mites and ticks. Many economically important species of mites and ticks are known, including the two spotted spider mite, the red spider mite, the strawberry spider mite, the citrus rust mite, the citrus red mite, the European red mite, the cattle tick, and the poultry mite. Chemicals useful for the control of mites are often called miticides, while those useful for the control of both mites and ticks are known specifically as acaricides.

For practical use as acaricides, the compounds of this invention are generally incorporated into acaricidal compositions which comprise an inert carrier and an acaricidally toxic amount of such a compound. Such acaricidal compositions, which can also be called formulations, enable the active compound to be applied conveniently to the site of the acarid infestation in any desired quantity. These compositions can be solids such as dusts, granules, or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in the solvents. Frequently solutions of acaricides can be dispersed under superatmospheric pressure as aerosols. However, preferred liquid acaricidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the acarid infestation. The emulsifiers most commonly used in these concentrates are nonionic or mixtures of nonionic with anionic surface-active agents.

A typical acaricidal composition according to this invention is illustrated by the following example, in which the quantities are in parts by weight.

EXAMPLE 24.—Preparation of a dust

Product of Example 2 _____ 10
Powdered talc _____ 90

The above ingredients are mixed in a mechanical grinder-blender and are ground until a homogenous free-flowing dust of the desired particle size is obtained. This dust is suitable for direct application to the site of the acarid infestation.

The compounds of this invention can be applied as acaricides in any manner recognized by the art. One method for destroying acarids comprises applying to the locus of the acarid infestation, an acricidal composition comprising an inert carrier and as the essential active ingredient, in a quantity which is toxic to said acarids, a compound of the present invention. The concentration of the new compounds of this invention in the acaricidal compositions will vary greatly with the type of formulation and the purpose for which it is designed, but generally the acaricidal compositions will comprise from about 0.05 to about 95 percent by weight of the active compounds of this invention. In a preferred embodiment of this invention, the acaricidal compositions will comprise from about 5 to about 75 percent by weight of the active compound. The compositions can also comprise such additional substances as other pesticides, stabilizers, spreaders, deactivators adhesives stickers fertilizers activators, synergists, and the like.

The compounds of the present invention are also useful when combined with insecticides in the compositions heretofore described. These insecticides can comprise from about 5% to about 95% of the active ingredients in the compositions. Use of the combinations of these insecticides with the compounds of the present invention provide acaricidal and insecticidal compositions which are effective in controlling acarids and insects and often provide results unattainable with separate compositions of the individual components. The insecticides with which the compounds of this invention can be used in the compositions to control insects, can include halogenated compounds such as DDT, methoxychlor, TDE, indane, chlordane, isobenzan, aldrin, dieldrin, heptachlor, endrin, mirex, endosulfon, dicofol, chlorobenzilate and the like; organic phosphorus compounds such as TEPP, schradan, ethion, parathion, methyl parathion, EPN, demeton, carbopheno-thion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, azobenzene, binapacryl and the like; organic carbamate compounds such as carbaryl, ortho 5353 and the like; organic sulfur compounds such as phenothiazine, phenoxathin, lauryl thiocyanate, bis(2-thiocyanoethyl)ether, isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, para-dichlorobenzene, an the like.

The new compounds of this invention can be used in many ways for the control of acarids, for example, by spraying on plants on which the acarids feed. The quantity of active compound of this invention to be used for acarid control will depend on a variety of factors, such as the specific acarid involved, intensity of the infestation, weather, type of environment, type of formulation, and the like. For example, the application of only one or two ounces of active chemical per acre may be adequate for control of a light infestation of an acarid under conditions unfavorable for its feeding, while a pound or more of active compound per acre may be required for the control of a heavy infestation of acarids under conditions favorable to their development.

The utility of the compounds of the present invention as acaricides was illustrated in experiments for the control of the two spotted spider mite. In these experiments, the test compounds were formulated by dissolving in an organic solvent, such as acetone, and dispersing the solutions in water containing a small amount of emulsifier such as polyoxyalkylene derivatives of monolaurate and/or monooleate. The above formulation was then applied to plants infested with 50 to 100 adults of the mites and held for five days. Thereafter adult mortality was observed. Some of the results were as follows:

| Test chemical | Concn., percent actual chemical (wt./vol. liquid) | Percent mortality |
|---|---|---|
| Product of Example 2 | 0.35 | 100 |
| Product of Example 4 | 0.35 | 99 |
| Product of Example 5 | 0.35 | 100 |
| Product of Example 2 | 0.10 | 100 |
| Do | 0.04 | 100 |
| Do | 0.01 | 100 |
| Do | 0.004 | 91 |
| Product of Example 9 | 0.35 | 100 |
| Do | 0.10 | 100 |
| Do | 0.01 | 100 |
| Do | 0.001 | 100 |
| Product of Example 12 | 0.35 | 100 |
| Do | 0.10 | 100 |
| Do | 0.01 | 100 |
| Do | 0.001 | 86 |
| Product of Example 15 | 0.35 | 100 |
| Do | 0.10 | 100 |
| Do | 0.01 | 97 |
| Do | 0.001 | 73 |
| Product of Example 18 | 0.35 | 99 |
| Do | 0.10 | 93 |
| Do | 0.01 | 76 |
| Control | | 0 |

We claim:
1. A method for the control of acarids which comprises applying to said acarids an acaricidal composition comprising an inert carrier and as an essential ingredient, in a quantity toxic to acarids the compound of the formula

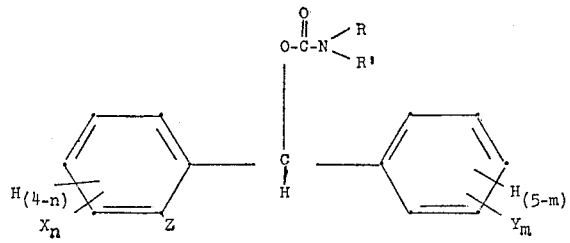

wherein R is selected from the group consisting of lower alkyl, lower alkenyl, lower alkoxyalkyl, lower mono and polychloroalkyl. R' is selected from the group consisting of hydrogen and R; Z is dialkylamino; each X and Y is independently selected from the group consisting of dialkylamino, alkyl, alkenyl, halogen, nitro, alkoxy and alkylthio; n is an integer from 0 to 2; and m is an integer from 0 to 3.

2. The method of claim 1 wherein the compound is N - methyl - 2 - dimethylamino - 2' - methyl-5-chlorobenzhydrylcarbamate.

3. The method of claim 1 wherein the compound is N - methyl - 2 - dimethylamino - 4' - methyl - 5 - chlorobenzhydrylcarbamate.

4. The method of claim 1 wherein the compound is N - methyl - 2 - dimethylamino - 4',5 - dichlorobenzhydrylcarbamate.

5. The method of claim 1 wherein the compound is N - methyl - 2 - dimethylamino - 3',5 - dichlorobenzhydrylcarbamate.

6. The method of claim 1 wherein the compound is N - methyl - 2 - dimethylamino - 5 - chlorobenzhydrylcarbamate.

7. An acaracidal composition comprising an inert carrier and, in a quantity toxic to acarids, the compound of the formula:

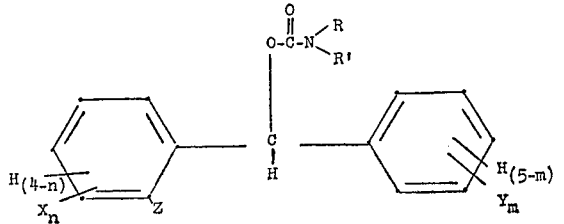

wherein R is selected from the group consisting of lower alkyl, lower alkenyl, lower alkoxyalkyl, lower mono and polychloroalkyl; R' is selected from the group consisting of hydrogen and R; Z is dialkylamino; each X and Y is independently selected from the group consisting of dialkylamino, alkyl, alkenyl, halogen, nitro, alkoxy and alkylthio; $n$ is an integer from 0 to 2; and $m$ is an integer from 0 to 3.

8. The acaricidal composition of claim 7 wherein the compound is N - methyl - 2 - dimethylamino-2'-methyl-5-chlorobenzhydrylcarbamate.

9. The acaricidal composition of claim 7 wherein the compound is N - methyl - 2 - dimethylamino-4'-methyl-5-chlorobenzhydrylcarbamate.

10. The acaricidal composition of claim 7 wherein the compound is N-methyl-2-dimethylamino - 4',5 - dichlorobenzhydrylcarbamate.

11. The acaricidal composition of claim 7 wherein the compound is N-methyl-2-dimethylamino - 3',5 - dichlorobenzhydrylcarbamate.

12. The acaricidal composition of claim 7 wherein the compound is N - methyl - 2 - dimethylamino - 5 - chlorobenzhydrylcarbamate.

References Cited

UNITED STATES PATENTS

| | | | |
|---|---|---|---|
| 2,338,380 | 1/1944 | Hester | 167—30 |
| 2,430,586 | 11/1947 | Ruthruff et al. | 260—618 |
| 2,530,653 | 11/1950 | De Benneville et al. | 260—487 |
| 2,854,374 | 9/1958 | Huisman | 167—30 |
| 2,872,476 | 2/1959 | Melkenian | 260—471 |
| 2,956,078 | 10/1960 | Duxbury | 260—471 |
| 3,098,001 | 7/1963 | Werres et al. | 260—482 |
| 3,340,294 | 9/1967 | Richter et al. | 167—30 |

ALBERT T. MEYERS, *Primary Examiner.*

J. GOLDBERG, *Assistant Examiner.*